United States Patent [19]
Petrosino

[11] Patent Number: 5,973,302
[45] Date of Patent: Oct. 26, 1999

[54] ENVIRONMENT CONTROL APPARATUS FOR USE WITH A PORTABLE COMPUTER

[76] Inventor: Chris Petrosino, 245 East Dr., Copiague, N.Y. 11726

[21] Appl. No.: 08/679,720

[22] Filed: Jul. 12, 1996

[51] Int. Cl.[6] .................................................. H05B 3/06
[52] U.S. Cl. ......................... 219/527; 219/201; 219/217; 219/528
[58] Field of Search .................................. 219/520, 528, 219/529, 531, 532, 535, 544, 545, 548, 549, 201, 211, 212, 213, 217

[56] References Cited

U.S. PATENT DOCUMENTS

3,146,340   8/1964   Dewey, II et al. ...................... 219/535
5,371,340  12/1994   Stanfield ................................. 219/548

*Primary Examiner*—Tu Ba Hoang
*Attorney, Agent, or Firm*—McAulay Nissen Goldberg Kiel & Hand, LLP

[57] ABSTRACT

An environment control apparatus having a shell adapted to be placed adjacent to a portable device and a heating element positioned to heat the shell and the adjacently positioned portable device. The heating element includes structure for receiving power from a power source and is selected to maintain the portable device at a temperature above a predetermined minimum temperature.

21 Claims, 11 Drawing Sheets

ENVIRONMENT CONTROL APPARATUS FOR USE WITH A PORTABLE COMPUTER

BACKGROUND OF THE INVENTION

Portable computer equipment is typically transported in a padded bag or case. The delicate components used to construct the portable equipment require certain environmental conditions. For example, one portable laptop manufacturer has specified the following operating environmental requirements: temperature range 50° F. to 104° F. and relative humidity 10% to 90%. The following non-operating conditions are also specified: temperature range 40° F. to 49° F. and 105° F. to 140° F. and relative humidity 5% to 95%.

The adverse effects of cold and moisture on a portable computer include mechanical failure, electronic failure, deterioration, and data storage difficulties including data loss.

While electronic components operate well in cold temperatures, mechanical components encounter difficulties. For example, the recommended temperature range for operation of a standard floppy disk drive is approximately 40° F. to 115° F. At the low end, the mechanical portions of the disk drive tend to operate sluggishly and with an increased possibility of data storage and retrieval errors. In addition, the silicon material from which the floppy disks are constructed becomes brittle in the cold temperature and may also contribute to potential operating difficulties.

Additional environmental concerns have been raised for equipment which employs a liquid crystal display (hereinafter referred to as "LCD"). The LCD material is known to coagulate at temperatures below 32° F. Exposure to such temperatures may result in the formation of black and white bubbles in the liquid crystal material, which causes a deterioration in the performance of the LCD.

Additional concerns exist due to the formation of condensation on equipment which has been transported from a cold environment to a warm environment. The potential for damage to the electrical system is increased when the computer is powered while condensation is present. The build up of condensation on electrical components may cause electrical problems including failure and/or damage. The effects of moisture, over time, can also cause mechanical failure, corrosion, oxidation and rusting.

At present, the industry recommends that before powering up a computer that was transported from a cold environment, the computer be placed in the warmer environment until the temperature of the computer is substantially the same as that of the warmer environment.

While the gradual temperature equalization associated with waiting before powering the equipment reduces some of the mechanical problems associated with a cold piece of equipment, it fails to offer sufficient protection for the LCD and it requires a substantial amount of temperature equalization time.

Accordingly, it is an object of the present invention to provide a transportation environment control device for a portable computer which maintains the transportation environment of the computer at levels which minimize the need to wait before one can safely operate a computer after transporting it through a cold environment.

It is a further objective to provide an environment control device which may be used with an existing computer transporting bag.

It is also a objective to provide an environment control device which is powered by the battery of the portable computer.

It is a further objective to provide an environment control device which is incorporated into a computer transport bag.

It is also an objective to provide an environment control device which incorporates a portable power supply.

BRIEF DESCRIPTION

An electronic equipment environment control device which includes a shell adapted to be placed adjacent to a portable device and a heating element positioned to heat the shell and the adjacently positioned portable device. The heating element includes structure for receiving power from a power source and is selected to maintain the portable device at a temperature above a predetermined minimum temperature.

DETAILED DESCRIPTION OF THE INVENTION

Figure 1:
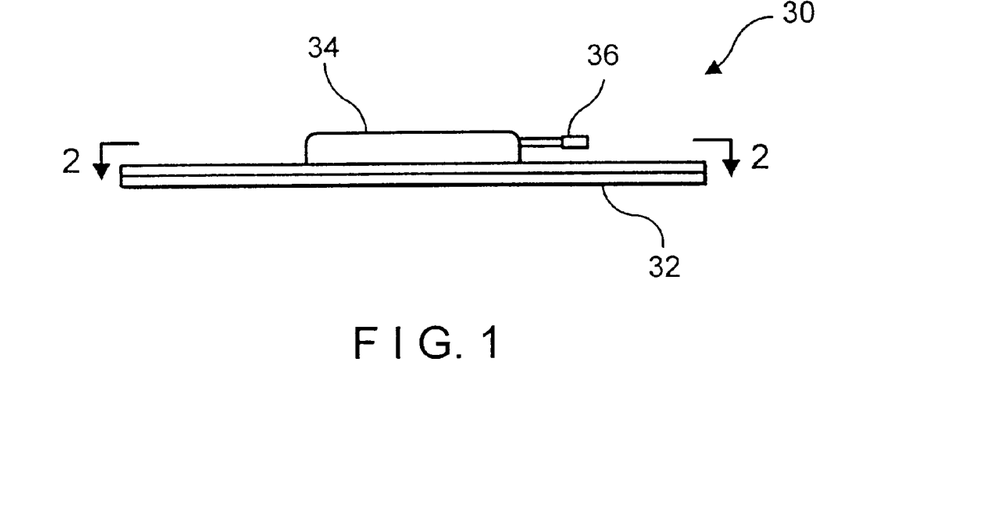
FIG. 1 is an end plan view of a first embodiment of an environment control device according to the present invention.

Referring to FIG. 1, an environment control apparatus 30 according to the present invention provides shell 32 adapted to be placed adjacent to a portable device and heating element 34 positioned to heat shell 32 and the adjacently positioned portable device. Heating element 34 provides means 36 for receiving power from an external power source. During operation, heating element 34, when powered by an external power source, maintains the portable device at a temperature above a predetermined minimum temperature.

Figure 2:
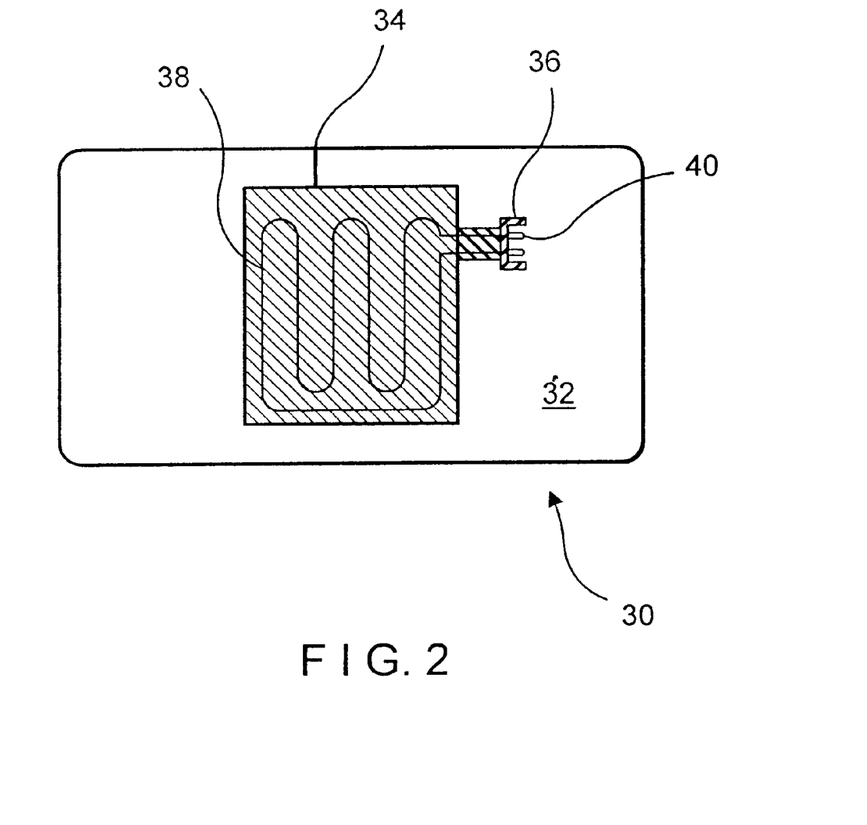
FIG. 2 is a partial cross-sectional view of the embodiment illustrated in FIG. 1, taken along the line 2—2 as illustrated in FIG. 1.

Referring to FIG. 2, heating element 34 includes heating conductor 38 connected to contact 40 of means for receiving power 36. As illustrated in FIGS. 1 and 2, means for receiving power 36 takes the shape of a connector.

Figure 3:
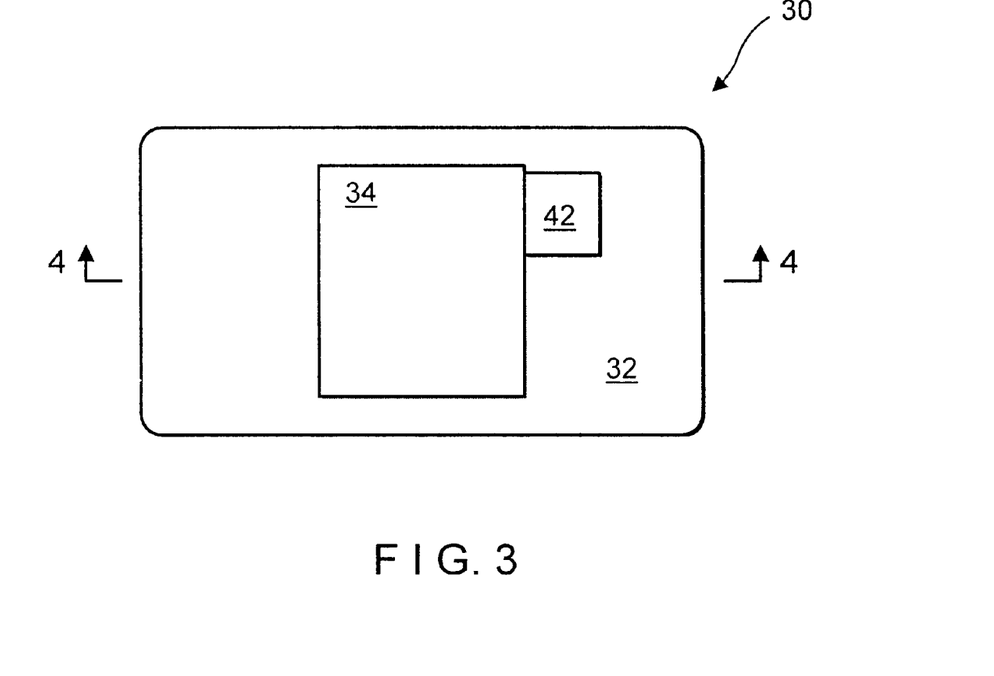
FIG. 3 is a side plan view of a second embodiment of an environment control device according to the present invention.
Figure 4:
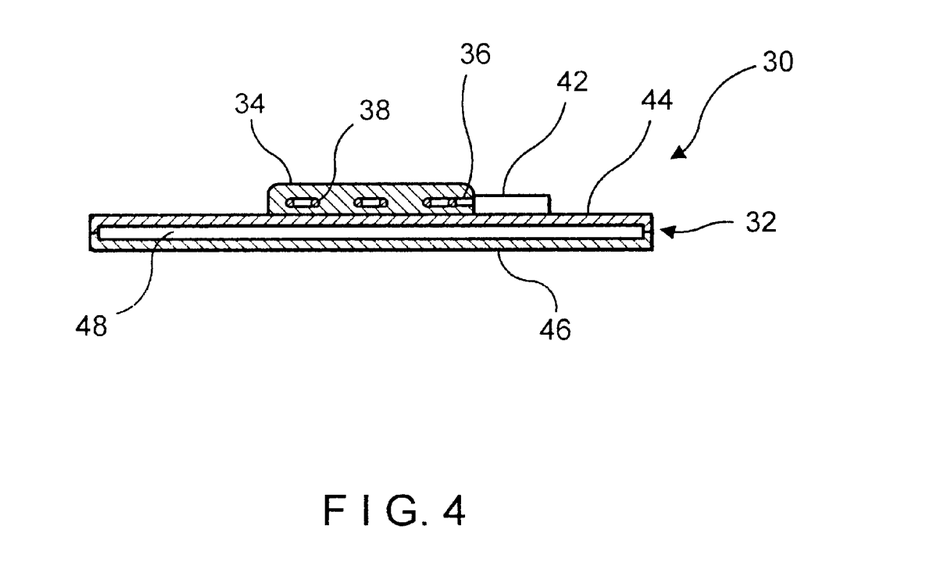
FIG. 4 is a partial cross-sectional view of the embodiment illustrated in FIG. 3, taken along the line 4—4 as illustrated in FIG. 3.

Referring to FIGS. 3 and 4, a second embodiment of environment control apparatus provides shell 32, heating element 34 and power supply 42. Power supply 42 and heating conductor 38 are interconnected by means 36 for receiving power from a power source. As illustrated in FIGS. 3 and 4, means 36 for receiving power form the power source are electrical connections.

For purposes of convenience, elements on embodiments which are similar are identified with the same identification numeral.

Shell 32, as illustrated in FIG. 4, is constructed of two plies of material 44, 46. A cavity 48 is provided between said two plies of material 44, 46. Alternatively, two plies of material 44 and 46 need not provide a cavity therebetween.

Figure 5:
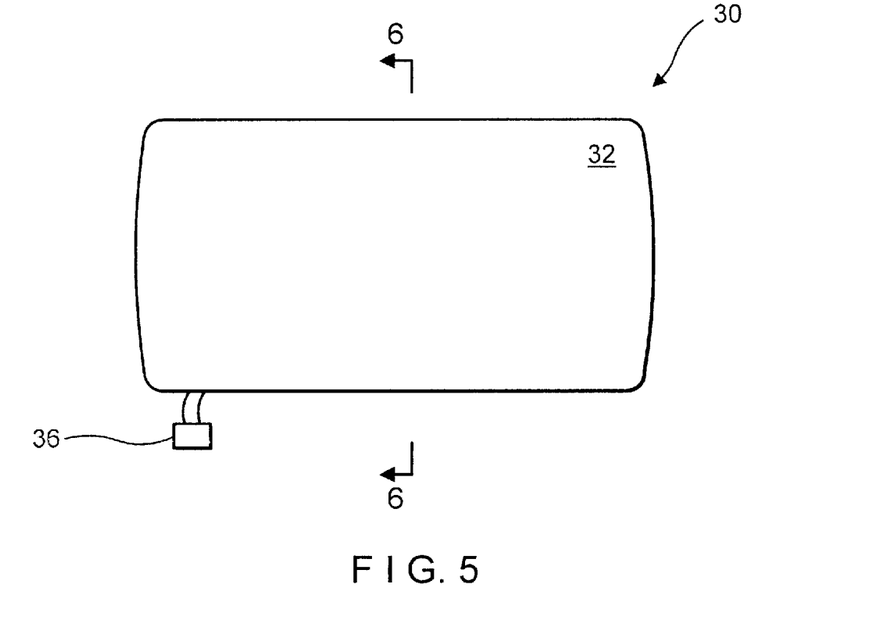
FIG. 5 is a side plan view of a third embodiment of an environment control device according to the present invention.
Figure 6:
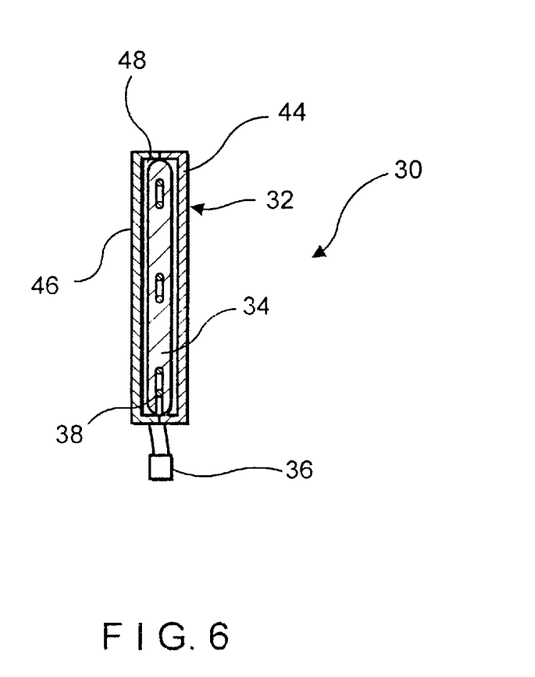
FIG. 6 is a partial cross-sectional view of the embodiment illustrated in FIG. 5, taken along the line 6—6 as illustrated in FIG. 5.

Referring to FIGS. 5 and 6, shell 32 is constructed to receive heating element 34. Means 36 for receiving power from an external power source extends through shell 32. Shell 32 comprises two plies of material 44, 46 so as to provide cavity 48 within which heating element 34 is positioned.

Figure 7:
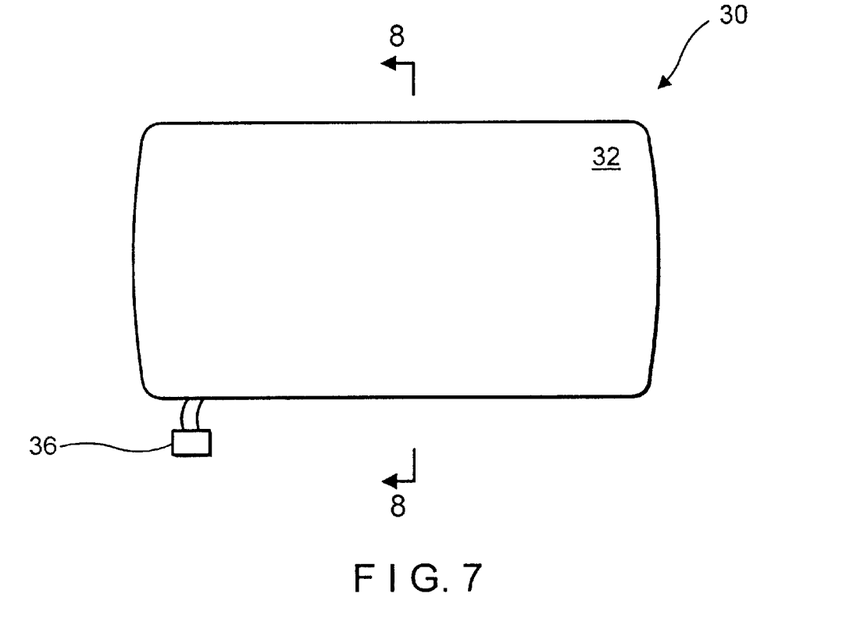
FIG. 7 is a side plan view of a fourth embodiment of an environment control device according to the present invention and is similar to the embodiment illustrated in FIGS. 5 and 6.
Figure 8:
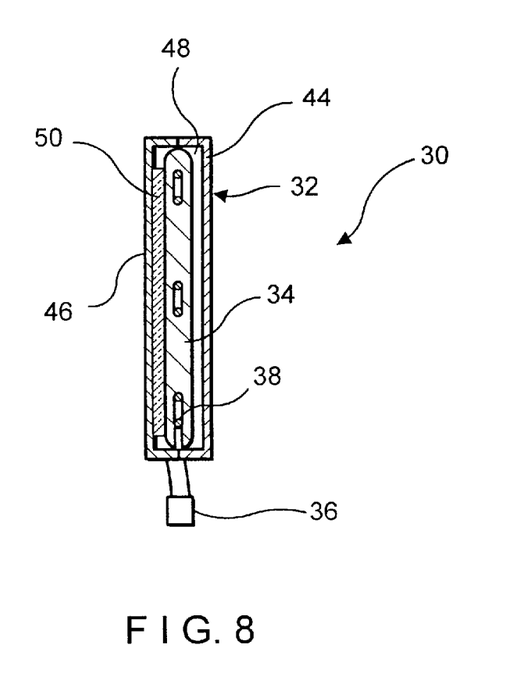
FIG. 8 is a partial cross-sectional view of the embodiment illustrated in FIG. 7, taken along the line 8—8 as illustrated in FIG. 7.

To provide a fourth embodiment, the embodiment illustrated in FIGS. 5 and 6 may be further modified as illustrated in FIGS. 7 and 8. In particular, insulation material 50 is added between heating element 34 and ply 46 of material which is used to construct shell 32.

Figure 9:
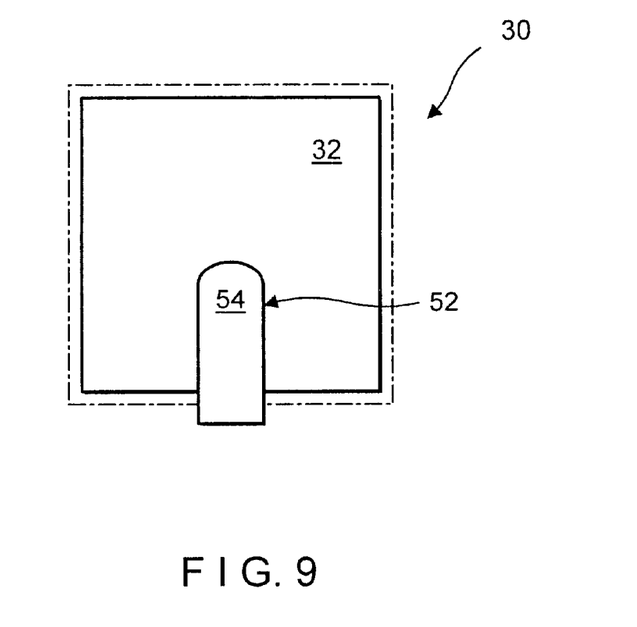
FIG. 9 is a side plan view of a fifth embodiment of an environment control device according to the present invention.
Figure 10:
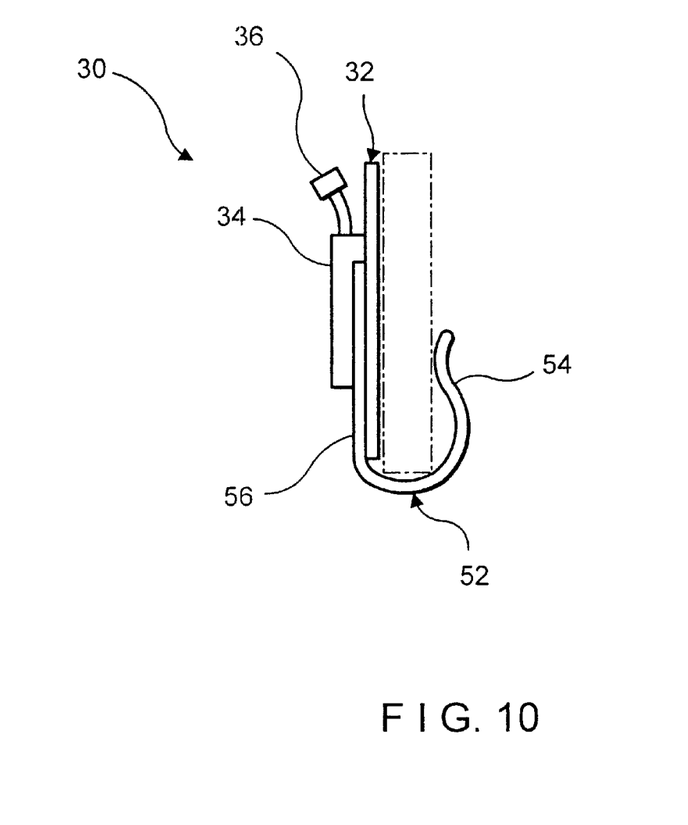
FIG. 10 is an end plan view of the embodiment illustrated in FIG. 9.

Referring to FIGS. 9 and 10, a fifth embodiment of the environment control apparatus 30 comprises shell 32, heating element 34 means 36 for receiving power from an external power supply and flexible member 52 providing first and second elements 54, 56 for positioning shell 32 adjacent to at least one side of a portable device (shown in shadow). The dimensions of shell 32 may be such as to exceed the external dimensions of the portable device being heated thereby or, as illustrated, may be smaller than the external dimensions of the portable device. The important feature is that the heat provided by the environment control apparatus 30 is sufficient to maintain the temperature of the portable device above the predetermined minimum temperature.

The environment control apparatus 30 illustrated in FIGS. 9 and 10 may be modified to incorporate a power supply 42 as illustrated in the embodiment of FIGS. 3 and 4.

Figure 11:
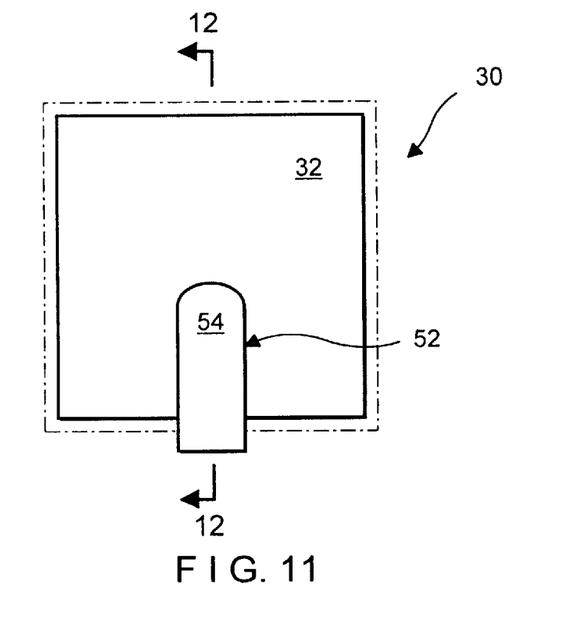
FIG. 11 is a side plan view of a sixth embodiment of an environment control device according to the present invention and is similar to the embodiment illustrated in FIGS. 9 and 10.
Figure 12:
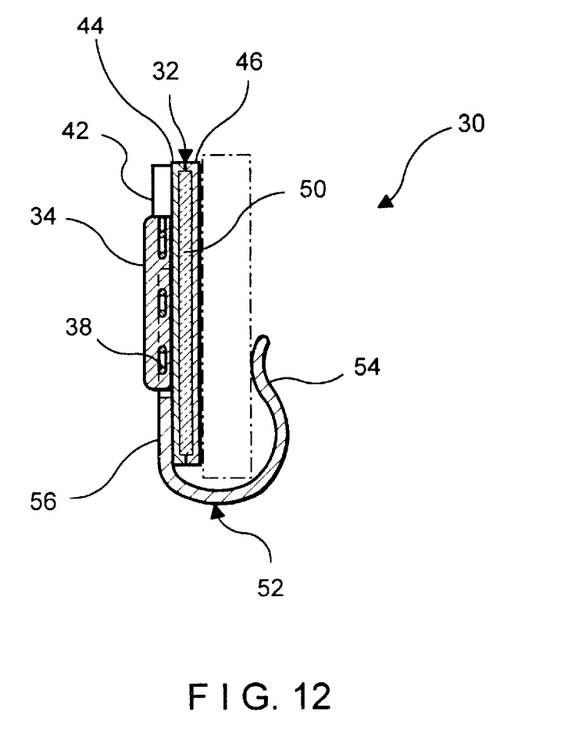
FIG. 12 is a cross-sectional view of the embodiment illustrated in FIG. 11, taken along the line 12—12 as illustrated in FIG. 11.

Referring to FIGS. 11 and 12, the environment control apparatus 30 provides a shell 32 constructed of two plies of material 44, 46. Insulating material 50 is positioned between first ply 44 and second ply 46 of shell 32.

Figure 13:
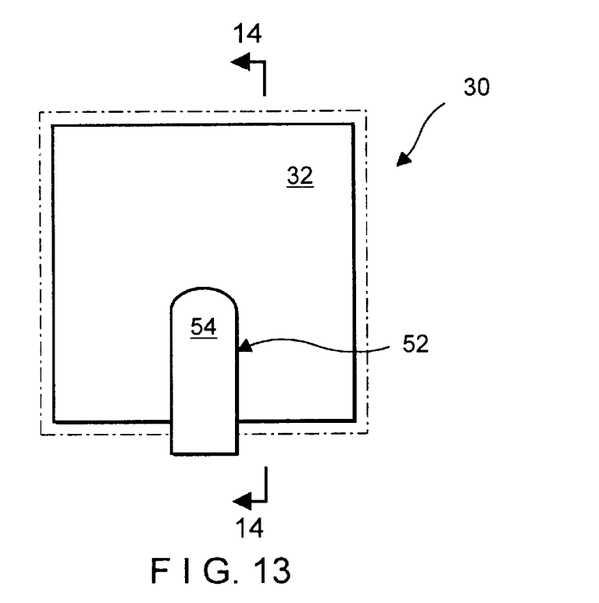
FIG. 13 is a side plan view of a seventh embodiment of an environment control device according to the present invention and is similar to the embodiments illustrated in FIGS. 9–12.
Figure 14:
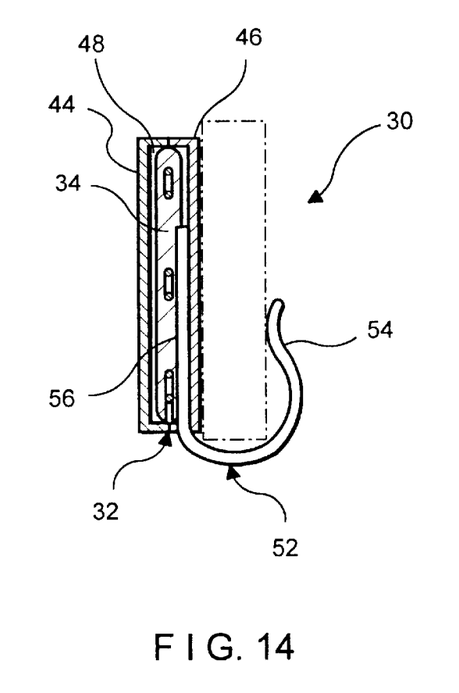
FIG. 14 is a partial cross-sectional view of the embodiment illustrated in FIG. 13, taken along the line 14—14 as illustrated in FIG. 13.

Referring to FIGS. 13 and 14, the environment control apparatus 30 includes shell 32 constructed of first ply 44 and second ply 46 creating cavity 48 therebetween. Heating element 34 and power supply 42 are positioned within cavity 48 of shell 32. Flexible member 52 includes first and second elements 54, 56 for positioning environment control apparatus 30 adjacent to the portable device (shown in shadow).

Figure 15:
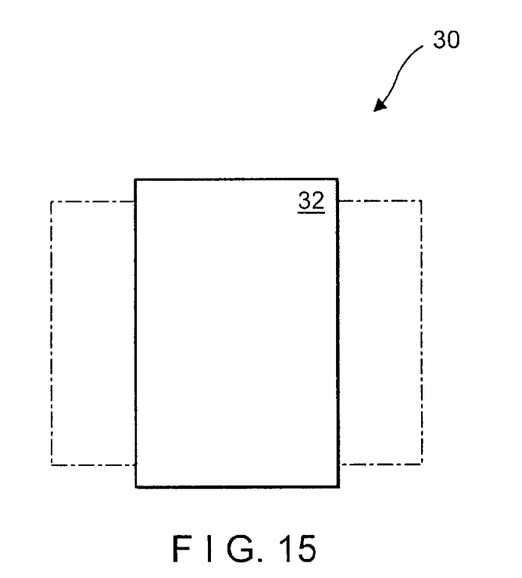
FIG. 15 is a side plan view of an eighth embodiment of an environment control device according to the present invention.
Figure 16:
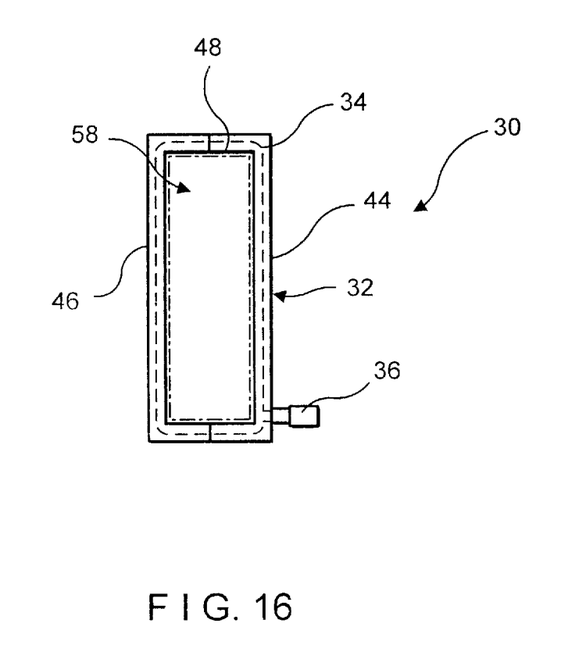
FIG. 16 is an end plan view of the embodiment illustrated in FIG. 15.

Referring to FIGS. 15 and 16, the environment control apparatus 30 is constructed having a central opening 58 adapted to receive a portable device. Heating element 34 may be embedded within or attached to one or more plies 44, 46 of shell 32.

Figure 17:
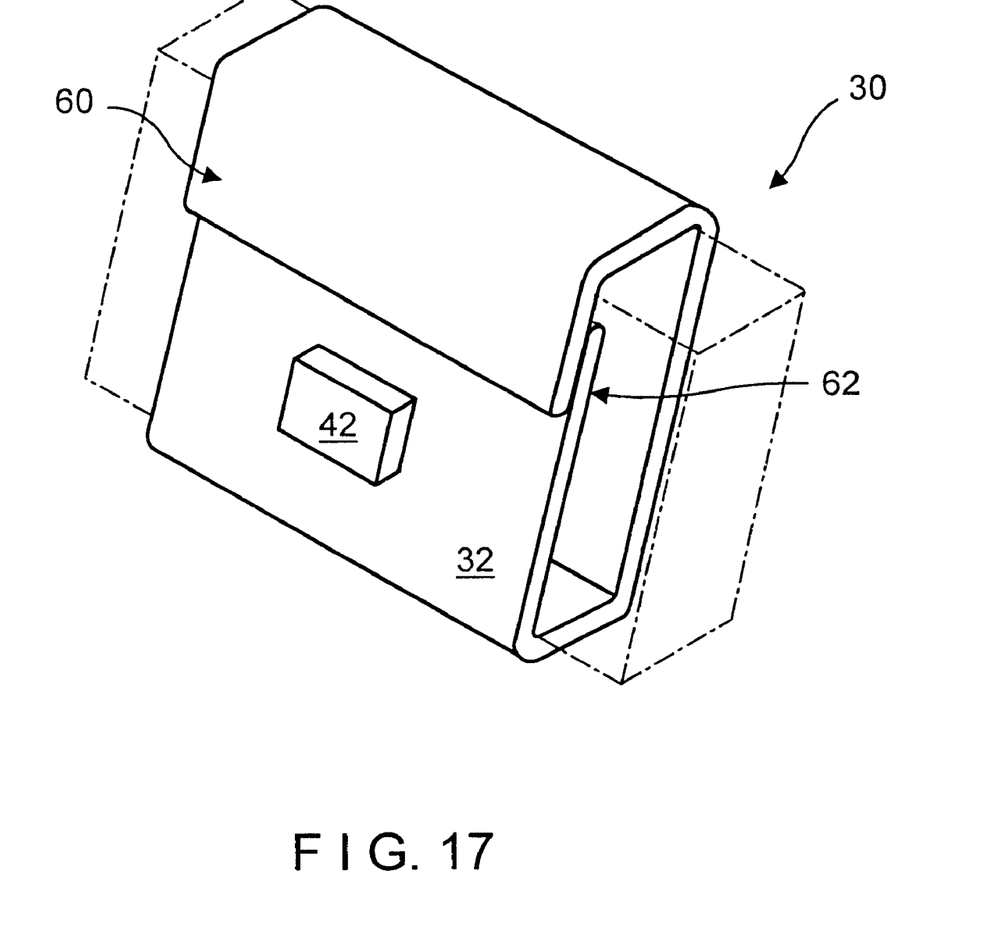
FIG. 17 is a perspective view of a ninth embodiment of an environment control device according to the present invention and is similar to the embodiment illustrated in FIGS. 15 and 16.

The environment control apparatus 30 illustrated in FIGS. 15 and 16 may be modified so as to permit the opening and closing of shell 32 around the portable device as illustrated in FIG. 17. A removable connection between the two overlapping layers 60, 62 may include a reusable fastener such as Velcro or the like. In addition, the environment control apparatus 30 illustrated in FIG. 17 provides power supply 42. The construction illustrated in FIG. 17 enables environment control apparatus 30 to accommodate a variety of sizes of portable devices.

Figure 18:
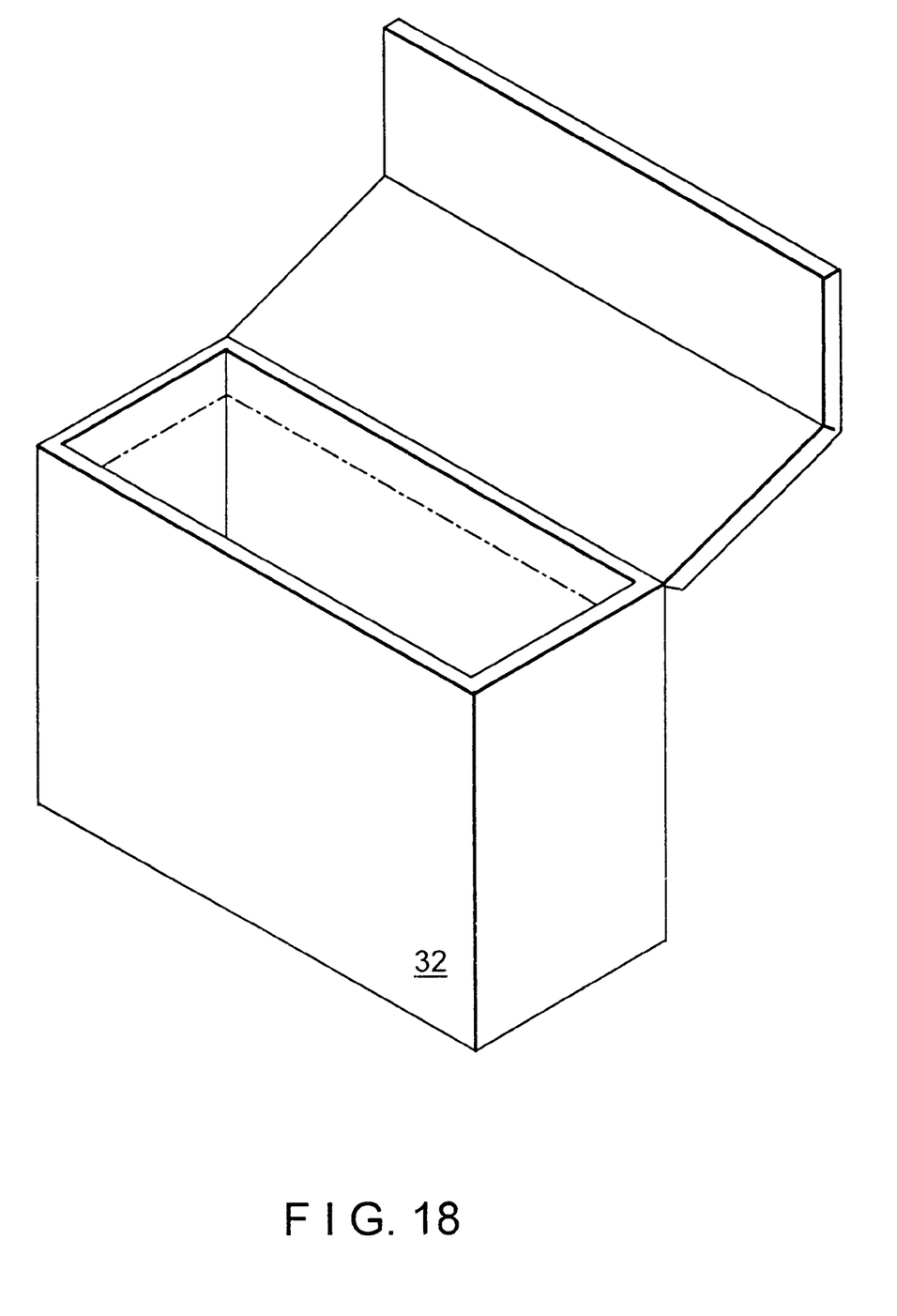
FIG. 18 is a perspective view of a tenth embodiment of an environment control device according to the present invention.

Referring to FIG. 18, the construction of shell 32 may be modified to provide an envelope or case-like structure which provides cavity 58 for receiving a portable device. Shell 32 may include an handle and act as a carrying case for a portable device or may used in connection with an existing carrying case by inserting the portable device into the environment control apparatus 30, which in turn is inserted into an existing carrying case.

The predetermined temperature to be maintained by each of the environment control apparatus 30 embodiments discussed herein is to be less than 140° F. and is preferably 40° F., 55° F., or 65° F. At no time, should the temperature fall below 32° F.

In addition, each of the environment control apparatus 30 disclosed herein may provide a hygroscopic material to reduce the buildup of condensation on a portable device protected thereby. More specifically, a silica gel may be inserted between the two plies of material 44, 46 which are used to construct shell 32 to include the added benefit of moisture absorption. Furthermore, in each of the environment control apparatus 30 disclosed herein, at least one ply of material used to construct shell 32 may be moisture resistant material so as to provide a moisture barrier.

Figure 19:
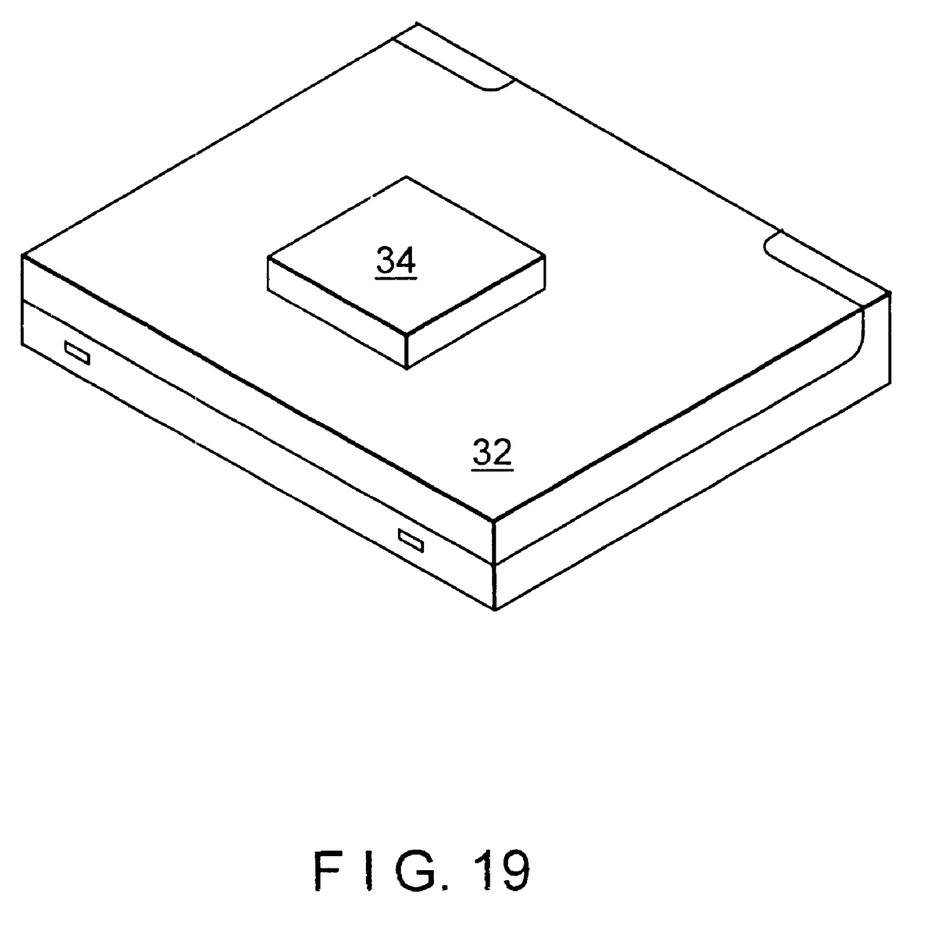
FIG. 19 is a perspective view of a tenth embodiment of the invention.

Referring to FIG. 19, shell 32 may be constructed as a housing of the portable device and heating element 34 is positioned outside of the housing. As an alternative embodiment, heating element 34 is positioned within the housing.

While a number of embodiments have been described having specific features, it is not beyond the scope of the present invention that any one or more features of one embodiment may be combined with any one or more features of other embodiments.

What is claimed is:

1. A portable computer environment control apparatus for protecting a portable computer in transportation environments, said apparatus comprising:

a shell having an opening for receiving said portable computer and a surface for contacting the portable computer; and, a heating element positioned to heat said surface, said heating element having means for receiving power from a power source and being selected to maintain the portable computer at a temperature above a predetermined temperature.

2. The environment control apparatus of claim 1 further comprising said power source.

3. The environment control apparatus of claim 1 wherein said heating element is attached to said shell.

4. The environment control apparatus of claim 1 wherein said shell comprises two plies of material.

5. The environment control apparatus of claim 4 wherein said heating element is positioned between said two plies.

6. The environment control apparatus of claim 5 further comprising insulation, said insulation being positioned between said heating element and at least one of said two plies.

7. The environment control apparatus of claim 4 further comprising moisture absorbent material, said moisture absorbent material being positioned between said two plies.

8. The environment control apparatus of claim 4 wherein one of said two plies of material acts as a moisture barrier.

9. The environment control apparatus of claim 1 wherein said predetermined temperature is 40 degrees Fahrenheit.

10. The environment control apparatus of claim 1 wherein said predetermined temperature is 55 degrees Fahrenheit.

11. The environment control apparatus of claim 1 wherein said predetermined temperature is 65 degrees Fahrenheit.

12. The environment control apparatus of claim 1, wherein said shell forms a sleeve for receiving the portable computer.

13. The environment control apparatus of claim 1, wherein said shell forms a case having a cavity for receiving the portable computer and a closure means for closing the opening and enclosing the portable computer.

14. The environment control apparatus of claim 1 wherein said heating element is selected to maintain the portable computer at a temperature of at least 32 degrees Fahrenheit and does not contribute to raising the temperature above 140 degrees Fahrenheit.

15. The environment control apparatus of claim 1 wherein said shell further comprises a moisture absorbent material.

16. The environment control apparatus of claim 1 wherein said shell is a housing of the portable computer.

17. A portable computer environment control apparatus for protecting a portable computer in transportation environments, said apparatus comprising:

a shell for wrapping around the portable computer, the shell having a surface for contacting the portable computer and a closure means for securing the shell around the portable computer; and, a heating element positioned to heat said surface, said heating element having means for receiving power from a power source and being selected to maintain the portable computer at a temperature above a predetermined minimum temperature.

18. A portable computer environment control apparatus for protecting a portable computer in transportation environments, said apparatus comprising:

a shell comprising a surface for contacting the portable computer and a flexible member having two elements for flexibly receiving the portable computer therebetween, said flexible member positioning said surface to at least one side of the portable computer; and, a heating element positioned to heat said surface, said heating element having means for receiving power from a power source and being selected to maintain the portable computer at a temperature above a predetermined minimum temperature.

19. The environment control apparatus of claim 18 wherein said shell comprises two plies of material.

20. The environment control apparatus of claim 19 wherein at least one of said two elements of said flexible member and said heating element are positioned between said two plies.

21. The environment control apparatus of claim 19 further comprising insulation, said insulation being positioned between said two plies.

* * * * *